Jan. 22, 1924. 1,481,579
C. A. WITTER
VEHICLE WHEEL
Filed Feb. 16, 1923   2 Sheets-Sheet 2
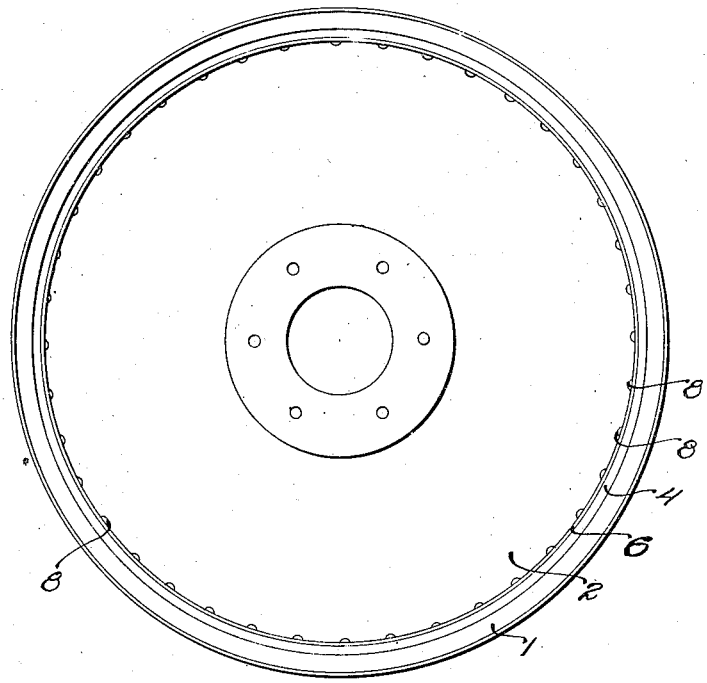
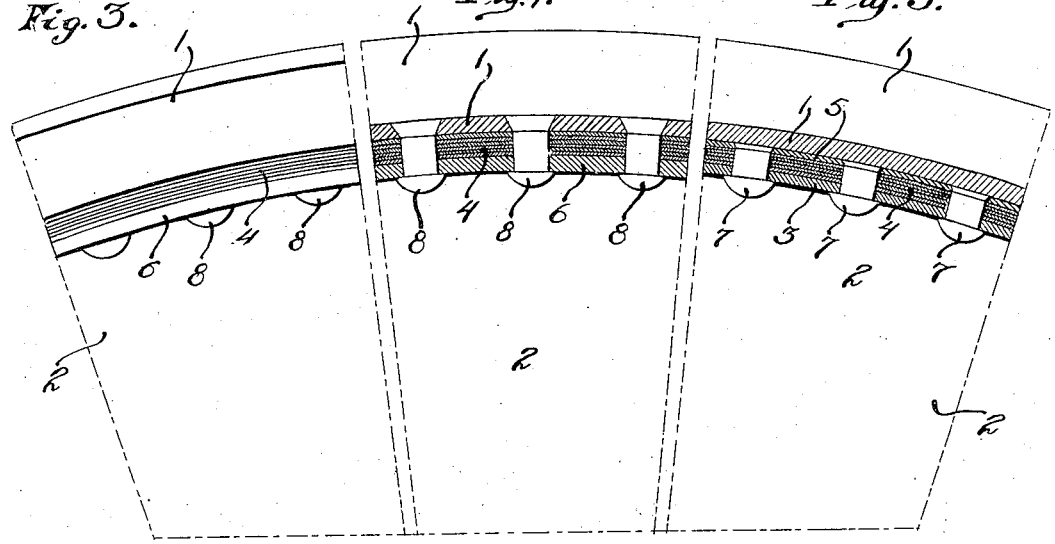
Witnesses
Charles H. Buckler
George A. Gruss
Inventor
Claude A. Witter
By Joshua R. H. Potts
His Attorney Patented Jan. 22, 1924.

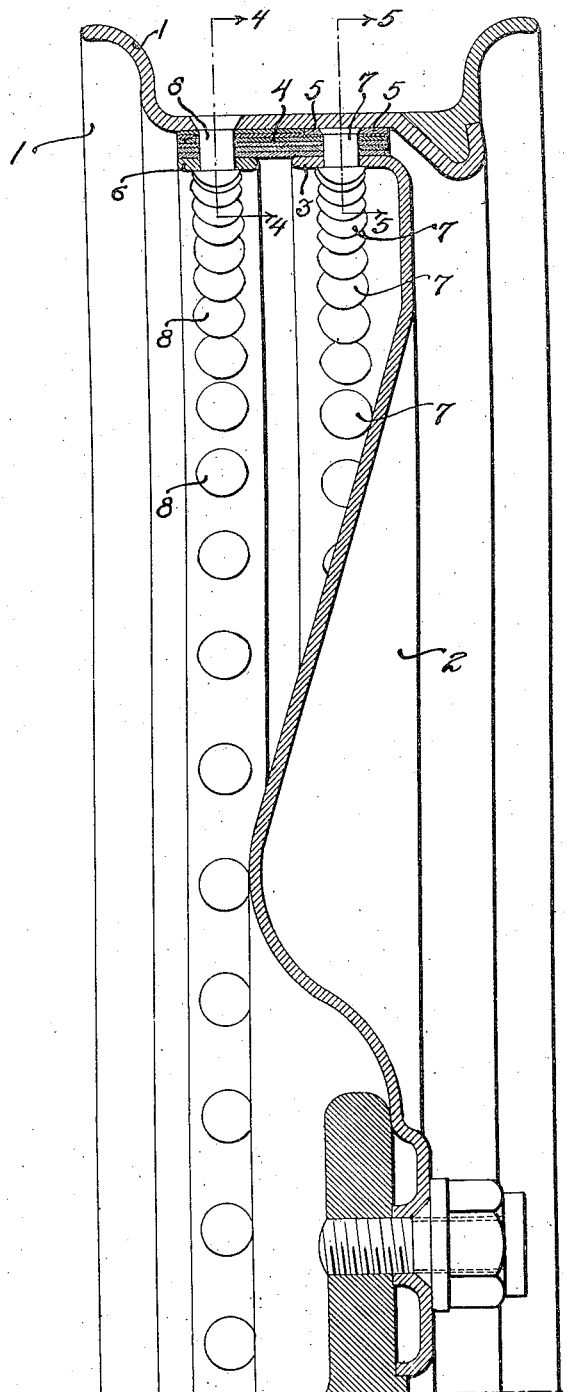

1,481,579

UNITED STATES PATENT OFFICE.

CLAUDE A. WITTER, OF PHILADELPHIA, PENNSYLVANIA, ASSIGNOR TO HALL WHEEL CORPORATION, OF PHILADELPHIA, PENNSYLVANIA.

VEHICLE WHEEL.

Application filed February 16, 1923. Serial No. 619,397.

*To all whom it may concern:*

Be it known that I, CLAUDE A. WITTER, a citizen of the United States, residing at Philadelphia, in the county of Philadelphia and State of Pennsylvania, have invented certain new and useful Improvements in Vehicle Wheels, of which the following is a specification.

My invention relates more especially to disk wheels of the general type used on motor vehicles and the object of my invention is to provide a simple and durable wheel of comparatively light construction which will be sufficiently rigid and yet resilient and which will absorb short vibrations and be noiseless when in use.

This object, and other advantageous ends which will be described hereinafter, I attain in the following manner, reference being had to the accompanying drawings in which—

Figure 1 is a partial cross section of an automobile wheel embodying my invention, Figure 2 a side elevation of a wheel embodying the invention, Figure 3 a segmental view in full lines.

Figure 4 a segmental view on line 4—4 of Figure 1, and

Figure 5 a like view on line 5—5 of Figure 1.

In the drawings the numeral 1 designates the rim of a wheel and 2 a metallic disk extending from the hub and carrying, at its periphery, an annular horizontal flange 3 spaced from the interior of the rim. A band 4 of non-metallic resilient material embraces the flange and is itself embraced by a metallic band 5 disposed within the rim. The resilient band extends beyond the flange and its extended side embraces a metallic band 6. The resilient band is secured to flange 3 by rivets 7 taking through the flange, the resilient band and metallic band 5, and is secured to the rim by rivets 8 taking through metallic band 6, the resilient band and the rim.

I prefer to use a resilient band consisting of laminated and rubberized fabric vulcanized in band shape but the band may be of any material which combines the needed resiliency with the needed resisting capacity.

It will be noted that one side of the resilient band is secured to the disk flange and the opposite side is secured to the rim and that the band is the only connecting link between the disk and rim. The disk is therefore free to flex in the line of its length. This permits a yielding movement of the rim, relatively to the disk, in addition to the yielding due to compression of the band.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A wheel including a hub; a rim; a disk, extending from the hub, having a horizontal annular flange spaced from the rim, and a resilient band embracing the flange and secured at one side to the flange and at the other side to the rim.

2. A wheel including a hub; a rim; a disk, extending from the hub, having a horizontal annular flange spaced from the rim, and a resilient band embracing the flange, extending to one side thereof and secured at one side to the flange and at the other side to the rim.

3. A wheel including a hub; a rim; a disk, extending from the hub, having a horizontal annular flange spaced from the rim; a resilient band embracing the flange and extending to one side thereof; a metallic band embracing one side of the resilient band, and a metallic band embraced by the side of the resilient band opposite the flange, the resilient band being secured at one side to the flange and to the exterior band and at the opposite side to the interior band and the rim.

In testimony whereof I have signed my name to this specification in the presence of two subscribing witnesses.

CLAUDE A. WITTER.

Witnesses:
Jos. B. KATZ,
CHAS. E. POTTS.